US012652523B2

(12) United States Patent
Sepe et al.

(10) Patent No.: US 12,652,523 B2
(45) Date of Patent: Jun. 9, 2026

(54) METHOD FOR MANAGING A NOTIFICATION PROCEDURE BETWEEN AN INTEGRATED CIRCUIT CARD OPERATING IN A COMMUNICATION DEVICE AND A PROVISIONING SYSTEM, CORRESPONDING SYSTEM AND INTEGRATED CIRCUIT CARD

(71) Applicant: STMicroelectronics International N.V., Geneva (CH)

(72) Inventors: Paolo Sepe, Quarto (IT); Alberto Marzaioli, Caserta (IT)

(73) Assignee: STMicroelectronics International N.V., Geneva (CH)

( * ) Notice: Subject to any disclaimer, the term of this patent is extended or adjusted under 35 U.S.C. 154(b) by 309 days.

(21) Appl. No.: 18/443,789

(22) Filed: Feb. 16, 2024

(65) Prior Publication Data

US 2024/0292206 A1    Aug. 29, 2024

(30) Foreign Application Priority Data

Feb. 27, 2023    (IT) ......................... 102023000003426

(51) Int. Cl.
*H04W 8/18*          (2009.01)
(52) U.S. Cl.
CPC .................................. *H04W 8/183* (2013.01)

(58) Field of Classification Search
CPC ...................................................... H04W 8/183
See application file for complete search history.

(56) References Cited

U.S. PATENT DOCUMENTS

2017/0338954 A1    11/2017  Yang et al.
2018/0060199 A1     3/2018  Li et al.

OTHER PUBLICATIONS

IT Search Report and Written Opinion for priority application, IT Appl. No. 102023000003426, report dated Sep. 6, 2023, 8 pgs.

*Primary Examiner* — Curtis B Odom
(74) *Attorney, Agent, or Firm* — Crowe & Dunlevy LLC

(57) ABSTRACT

A notification procedure is executed between an integrated circuit card operating in a communication device and a remote provisioning system. When the notification procedure is interrupted, the integrated circuit card is reset and a reset variable or flag is set. Notification information including a notification message, notification sequence number and a number of said one or more attempts left to perform for the notification procedure is stored in memory. After reset, the notification information is retrieved. If the reset variable or flag is set, the notification sequence number is maintained and a next attempt of the notification procedure is performed. If the reset variable or flag is not set, the notification sequence number is incremented. The reset variable or flag is reset when the notification procedure is completed.

14 Claims, 5 Drawing Sheets

METHOD FOR MANAGING A NOTIFICATION PROCEDURE BETWEEN AN INTEGRATED CIRCUIT CARD OPERATING IN A COMMUNICATION DEVICE AND A PROVISIONING SYSTEM, CORRESPONDING SYSTEM AND INTEGRATED CIRCUIT CARD

PRIORITY CLAIM

This application claims the priority benefit of Italian Application for Patent No. 102023000003426 filed on Feb. 27, 2023, the content of which is hereby incorporated by reference in its entirety to the maximum extent allowable by law.

TECHNICAL FIELD

Embodiments of the present disclosure relate to techniques for managing a notification procedure between an integrated circuit card, in particular an embedded Universal Integrated Circuit Card (eUICC) card, operating in a communication device configured to communicate with a mobile communication network, and a remote provisioning system. Embodiments of the present disclosure relate in particular to eUICC cards, in particular as specified in GSMA standards.

BACKGROUND

Due to new requirements of miniaturization and robustness, the industry has developed an evolution of the traditional Universal Integrated Circuit Card (UICC) cards referred to as "embedded UICC". This evolution envisages that the UICC is soldered (or in any case made hardly accessible) in the hosting device that can be a mobile phone, a modem, a board inserted in a device, etc.

Soldering presents distinct advantages such as the possibility of reducing the size of the UICC device and hence of the modem, the improvement of the robustness of the contacts (soldered contacts are typically more reliable than interfaces between replaceable components), the increased antitheft protection.

On the other hand, soldering a UICC (or making it hardly accessible) introduces new requirements and issues that need to be addressed, such as: the UICC is not replaceable, means should be available to allow the operator change; and specific operations (such as device repairing), that today are typically performed after the UICC removal, require a way to disable the SIM card.

To address the above requirements, the industry has defined a new technological standard called "embedded UICC" or "Remote SIM provisioning". The basic concepts of the new technological standard are the following: one entity is defined to allow the download/enable/delete of profiles (for instance the Issuer Secure Domain Root ISD-R, see for instance "Remote Provisioning Architecture for Embedded UICC, Technical Specification, Version 1.0, 17 Dec. 2013"); the UICC may contain several mobile network operator subscriptions; each operator subscription is represented by a "profile"; and every profile may be seen as a container; the container is managed by a security domain (for instance the Issuer Secure Domain Profile ISD-P).

In this context, FIG. 1 shows a possible architecture of a "user equipment" 10, such as a mobile device, e.g., a smartphone or a tablet, or a mobile communication module usually to be used in embedded systems.

Generally, the device 10 comprises one or more processors (Proc) 102 connected to one or more memories 104. The device 10 comprises moreover at least one mobile communication interface 106 for communication with a base station BS.

For example, the mobile communication interface 106 may comprise a GSM (Global System for Mobile Communications) transceiver, a CDMA (Code Division Multiple Access) transceiver, a W-CDMA (Wideband Code Division Multiple Access), a UMTS (Universal Mobile Telecommunications System) transceiver, a HSPA (High-Speed Packet Access) transceiver and/or an LTE (Long Term Evolution) transceiver.

A mobile device often comprises also a user interface (U-I/F) 110, such as a touchscreen. Conversely, a communication module to be used, e.g., in embedded systems, such as alarm systems, gas meters or other types of remote monitoring and/or control systems, often does not comprise a user interface 110, but a communication interface (C-I/F) 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored, for example, an operating system OS being executed by the processor 102 and which manages the general functions of the device 10, such as the management of the user interface 110 and/or the communication interface 112 and the establishment of a connection to the base station BS via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the identity identification of the user. For example, usually a mobile device comprises a card holder for receiving a card comprising a Subscriber Identity Module (SIM), which is usually called SIM card. Generally, a corresponding SIM module may also be installed directly within the device 10. In the example of FIG. 1 it is used an integrated circuit card, specifically is a Universal Integrated Circuit Card (UICC) 108, which is a smart card often used in GSM and UMTS networks. The UICC ensures the integrity and security of all kinds of personal data and typically holds a few hundred kilobytes. The UICC in the example is integrated directly in the device 10 and is in this case often called embedded UICC (eUICC).

For example, in a GSM network, the eUICC 108 contains a SIM application and in a UMTS network a USIM application. A eUICC may contain several applications, making it possible for the same smart card to give access to both GSM and UMTS networks, and may also provide storage of a phone book and other applications.

Accordingly, the reference to a SIM module in the following of the present description is intended to include both 2G, 3G, 4G and 5G SIM modules and further generations of mobile communications to which the solution here described is applicable. Such reference applies also the case in which such a SIM module is provided on a SIM card.

As shown in FIG. 2, a SIM module 108 often comprises one and more processors (SIM Proc) 1082 and one or more memories 1084 for executing applications stored in the memory 104 of the module 108. The one or more memories 1084 may comprise a non-volatile memory portion and a RAM memory portion. For example, the SIM module 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 106. Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30.

As indicated, the card 108 may be an eUICC. An embedded UICC is an UICC (Universal Integrated Circuit Card) which is not easily accessible or replaceable, is not intended to be removed or replaced in the device (i.e., user equipment 10), and enables the secure changing of profiles. To this regard the card 108 may be a multi-subscription card, or SIM module, which can support a plurality of profiles.

A profile is a combination of a file structure, data and applications to be provisioned onto, or present on, an integrated circuit card such as an eUICC and which allows, when enabled, the access to a specific mobile network infrastructure.

The state of a profile is enabled when its files and/or applications are selectable over the UICC-Terminal interface.

Over the air provisioning may be performed to update from remote data in the integrated circuit card, e.g., eUICC, in particular profiles. A SM-SR (Subscription Manager Secure Routing) is a server that is configured to manage over the air communication with the integrated circuit card, and is in charge of sending administrative commands to an ISD-R (Issuer Security Domain-Root) in the integrated circuit card, such as an ISD_R configured to enable a certain profile on the integrated circuit card, e.g., eUICC. The eUICC structure includes a hierarchy of different security domains assigned with specific access rights and privileges. The root of all eUICC accesses is the ISD-R. Through the ISD-R are crated new ISD-P (issuer security domain-profile) instances as a container for a given profile of a mobile operator. Access to the profile data within such a container is restricted to the profile owner, i.e., the mobile network operator (MNO).

The ISD-R is thus the representative of the off-card entity SM-SR and receives and processes the commands to enable a certain profile on the eUICC, thus disabling the currently enabled profile.

FIG. 3 shows a schematic representation of a system for managing profiles in industrial eUICC cards 50, which includes a data preparation server 51, e.g. a SM-DP server, responsible for the creation, generation, management and the protection of resulting profiles at the input/request of the operator. Such data preparation server 51 for instance may include a database of profiles and, additionally other modules like an OTA RFM (Over The Air Remote File Management) engine and a Keys Manager. The data preparation server 51 provides, for instance through an OTA (Over The Air) channel, profiles P, in particular personalized profiles, to a Secure Routing server 61, e.g. a SM-SR server, which is configured to secure routing of profiles and usually sends a profile download enabling command to the eUICC card 108, which is embedded in the local user equipment 10 (as also visible in FIG. 2), i.e., a smart card integrated in a local communication device, thus enabling download and storing of the profile P in the eUICC card 108. The system also includes a Mobile Network (MNO) operator 62, which can issue for instance a profile ordering command to the data preparation server 51. In FIG. 3 are also indicated a Certificate Issuer (CI) 63, which issues Certificates for remote SIM provisioning entities and acts as a trusted third party for the purpose of authenticating the entities within the system, and an eUICC Manufacturer (EUM) 64 which is responsible for the initial cryptographic configuration and security architecture of the eUICC 16 and is the provider of eUICC products. These system components are not here described in further detail. The lines, solid or dashed, indicated the communication interfaces between the entities, servers and devices. A description of the operation of a provisioning system like the system 50, i.e., a eUICC Remote Provisioning System can be found in the GSMA SGP.02-v4.2, in particular par. 2.1.

Thus, in the system 50, the SM-DP (server 51, an OTA server) contains profiles and represents the MNO. The SM-SR (server 61, also an OTA server) executes commands (load/enable . . . ) in batches over the device installation basis, e.g., downloading profiles on all the cards on the field.

A default notification procedure is started by the eUICC under certain conditions. This default notification carries information about the eUICC and the Device, i.e., the user equipment into which an Embedded UICC and a communication module are inserted during assembly, e.g., mobile phone, or utility meter, or car or camera. Such default notification procedure it is used to synchronize the status of the eUICC with the SM-SR and it is described for instance in the specification GSMA SGP.02-v4.2, par. 3.15.

FIG. 3 also shows a notification N sent by the eUICC 108 to the SM-SR server 61 within the notification procedure, namely on an eUICC/SM-SR communication interface which in the GSMA is indicated as ES5.

This notification procedure is initiated by the eUICC in the following conditions:

first network attachment of the Device: this indicates to the SM-SR server in charge of managing of the eUICC that the eUICC has been deployed on the field. This happens once in a lifetime of an eUICC, usually;

after an explicit new Profile Enabling request: this indicates to the SM-SR which is the Profile which is currently enabled, where this notification happens right after the network attachment:

with the newly Enabled Profile in case of successful attachment; or with the previously Enabled Profile or with the Profile having the Fall-Back Attribute, after the attachment with the requested Profile has failed. In integrated circuit cards, specifically eUICCs, the fallback attribute is an attribute of a Profile which, when set, identifies the Profile to be enabled by the Fall-Back Mechanism. The Fall-Back Mechanism is activated in case of loss of network connectivity of the current Enabled Profile. The eUICC is configured to disable the current Enabled Profile and enable the Profile with Fall-Back Attribute set stored in its memory. The fallback attribute is introduced to guarantee network and service coverage to the customers of the eUICC devices with no dependences from specific network operators; and after activation of the Fall-Back Mechanism: this indicates to the SM-SR server that the Profile with the Fall-Back Attribute has been enabled. This notification happens right after the network attachment.

Moreover, dependent on the configuration of the eUICC, the eUICC may send a Notification about the Profile change after Emergency Profile/Test Profile disabling to the SM-SR server.

The notification may happen either on SMS (Short Message System), CAT_TP (Card Application Toolkit Transport Protocol) or HTTPS. The content of the notification message is the same whatever protocol is used.

Several heuristics, i.e., strategies, can be implemented in the eUICC for performing the notification procedure. In general, the mechanism could provide several retries with the different protocols allowed.

The notification has to be confirmed by the SM-SR server. The confirmation will depend on the protocol used for notification.

On reception of a SM-SR notification confirmation, the eUICC may perform any operation (follow-up activities) and respond to the SM-SR notification confirmation function, including the identification of the operation performed, if any.

A notification sequence number identifies the notification message and allows the SM-SR server to distinguish a new notification from a retry. So, in case of a retry, the eUICC is configured to use the same notification sequence number.

When a Notification Confirmation has been successfully received by the SM-SR server, the eUICC is configured o increment the sequence number for the next notification.

If the eUICC does not receive the confirmation from the SM-SR server, the eUICC may retry sending the notification, using the same sequence number.

FIG. 4 shows a signal diagram representing the sequence flow of the notification procedure 200 on SMS.

The attachment 201 of the device 10 to the network occurs. At the end of the start-up sequence, the eUICC 10 detects 202 a first "power on" or a situation where the Enabled Profile has changed compared to the previous eUICC reset. The eUICC 108 sends 203 an MO-SMS envelope, i.e., a SMS message, which represents a notification N. The SMS contains a secure SCP 80 Command Packet using the SCP80 keys of the relevant ISD-R and containing a notification data structure. The eUICC 108 is configured to use the network information of the Enabled Profile, and the addressing information configured for this profile in ISD-R. The eUICC 108 is configured to retry sending until getting a successful response of the user equipment, i.e. device 10, in step 204. The eUICC 108 is configured to use another protocol in case of final failure for sending the notification using SMS.

The eUICC 108 is configured then to wait 205 for the SM-SR 61 notification confirmation NC. If no notification confirmation NC (step 207 described below) is received by the eUICC 108 after a certain number of times, the eUICC 108 is configured to restart from step 203 (with a same sequence number).

Step 206 indicates the processing by the SM-SR of the notification N. Depending on the result of the processing, the SM-SR 61 sends 207 a confirmation to the eUICC 108. If the eUICC 108 does not receive the confirmation from the SM-SR server 61, the eUICC 108 may retry sending the notification N. After having exhausted all possible retries, the eUICC 108 will roll-back to the previously Enabled Profile. In step 207, the SM-SR server 61 sends an MT-SMS containing the confirmation NC (in GSMA "ES5. Handle-NotificationConfirmation") command in a SCP80 command packet, targeting the entity on the eUICC 108 that has sent the notification N. In a step 208, the ISD-R un-wraps the SCP80 security layer from the confirmation, then in a step 209, the eUICC 108 processes the notification confirmation data; this may include follow-up activities as required by the procedure where this sequence is used. Then in step 210 the eUICC 108 is configured to return a response message NCR, i.e., a MO-SMS containing the response of the confirmation command NC. The eUICC 108 is configured to retry sending until getting a successful response of the user equipment or Device 10.

Thus, basically the notification procedure comprises at least the steps of: sending 203 a notification message N from the integrated circuit card 108 to the server or node 61, i.e., SM_SR; sending 207 a notification confirmation NC from the server or node 61 to the integrated circuit card 108; and sending 210 said notification confirmation response NCR to said server or node 61 from said integrated circuit card 108.

Other steps among steps 201-210 may be present or also other steps depending from the communication protocol selected, e.g. HTTPS as illustrated in the GSMA SGP standard.

The embodiment shown in FIG. 4 concerns the use of SMS protocol, although, as mentioned, other protocols such as HTTPS can be used.

Such default notification procedure, regardless of the protocol used, takes time. The range is from a few seconds to hours.

Therefore, it may happen that, during any of the steps of the notification procedure, the power may be cut off (e.g. the cell phone battery runs out).

In this power interruption scenario, the eUICC should be able to retain certain information (e.g., sequence number, number of attempts already performed or left, which has been already written in the card, namely in the non-volatile memory). The number of attempts may include a number of retry for a given communication protocol of notification procedure performed or left and the protocols to still be used), in order to resume the notification procedure at the next power on of the device, keeping the context in which it was first attempted. Also, even in the case the eUICC would be able to provide in some way recovery of the correct information after the eUICC reset, the state machine that manages the notification procedure should take into account the reset event to avoid synchronization problems with the server (i.e., wrong sequence number).

Thus, a drawback of the current known solution is that the eUICC is not able to retain the correct information after an eUICC reset and also not able to take into account the eUICC reset event itself. More in general, no management of a power loss event during notification process could produce synchronizations problems between the eUICC and the SM-SR.

On the basis of the foregoing description, the need is felt for solutions which overcome one or more of the previously outlined drawbacks.

SUMMARY

One or more embodiments concern a method. Embodiments moreover concern a related system architecture and an integrated circuit card.

In an embodiment, a method is presented for managing a notification procedure between an integrated circuit card, in particular an eUICC, operating in a communication device configured to communicate with a mobile communication network, and a remote provisioning system, said notification procedure being activated by a given event occurring at the communication device, said notification procedure comprising performing one or more attempts of sending by the integrated circuit card a notification comprising a notification message to a node of said provisioning system, in particular a SM-SR server, configured to manage over the air communication with the integrated circuit card, said notification procedure comprising associating to a notification a notification sequence number.

The method comprises: providing in the integrated circuit card a reset variable or flag, in particular a power loss variable or flag, which is configured to be set to indicate an integrated circuit card reset, in particular due to a power loss, at the beginning of said notification procedure; saving notification information, including said notification message, said notification sequence number and a number of said one or more attempts left to perform, in persistent objects in the memory, in particular non-volatile memory, of the integrated circuit card; when an event, in particular a power loss, interrupting said notification procedure occurs at the communication device, then, after an integrated circuit card circuit reset, retrieving said notification information from said persistent object; checking the value of said reset, in particular power loss, variable or flag; where the value of said reset, in particular power loss, variable or flag indicates an integrated circuit card reset, in particular due to a power loss, maintaining the notification sequence number and performing the next of said one or more attempts of notification procedure left; where the value of said reset, in particular power loss, variable or flag does not indicate an integrated circuit card reset, in particular due to a power loss, incrementing the notification sequence number; setting said reset, in particular power loss, variable or flag to not indicate an integrated circuit card reset, in particular due to a power loss, when said notification procedure is completed or when said notification procedure is failed for a protocol failure, or, in particular a reason different from power loss or other card reset determining event.

In variant embodiments, said number of attempts may include a number of retries for a given communication protocol of notification procedure performed or left and the communication protocols still to be used in a set of communication protocols that can be used for the notification procedure.

In variant embodiments, said notification procedure is performed upon occurrence of one of the following conditions: first network attachment of the communication device; after a new Profile Enabling request by the integrated circuit card; and after activation of a Fall-Back Mechanism enabling a Profile with the Fall-Back Attribute.

In variant embodiments, said notification procedure comprises: sending a notification message from the card to the server; sending a notification confirmation from the server to the card; and sending said notification confirmation response to said server from said card.

In variant embodiments, said method comprises the operations of: upon a network attachment of the device, at the end of a start-up sequence, detecting by the card a first "power on" or a change of the Enabled Profile compared to a previous card reset; checking at the card if the value of said reset, in particular power loss, variable or flag indicate or not an integrated circuit card reset, in particular due to a power loss; in the negative, in particular if there is no notification procedure pending, incrementing the sequence number setting reset, in particular power loss, variable or flag to indicate an integrated circuit card reset, in particular due to a power loss, starting a new notification procedure, sending a notification message, to said server; when a card reset determining event, in particular a power loss event, occurs during the notification procedure, performing an integrated circuit card reset then checking if the value of said reset, in particular power loss, variable or flag indicate or not an integrated circuit card reset, in particular due to a power loss; in the affirmative maintaining the sequence number and performing again the notification procedure, sending said notification from the card to the server, sending said notification confirmation to the card from the server and sending said notification confirmation response to said server from said card; and upon completion of said notification procedure setting the reset, in particular power loss, variable or flag to indicate no power loss.

In variant embodiments, said integrated circuit card is an eUICC, said node is a SM-SR server and said integrated circuit card and provisioning system operate according to a GSMA standard.

The present disclosure also provides solutions regarding a system architecture, comprising an integrated circuit card, in particular eUICC, operating in a communication device configured to communicate with said communication network, said system comprising a server, in particular a SM-SR server, configured to manage over the air communication with the integrated circuit card, wherein it is configured to perform the operations of the method according to embodiments.

The present disclosure also provides solutions regarding an integrated circuit card, in particular an eUICC, configured to perform the card operations of the method according to embodiments.

BRIEF DESCRIPTION OF THE DRAWINGS

Embodiments of the present disclosure will now be described with reference to the annexed drawings, which are provided purely by way of non-limiting example and in which.

DETAILED DESCRIPTION

Figure 1:
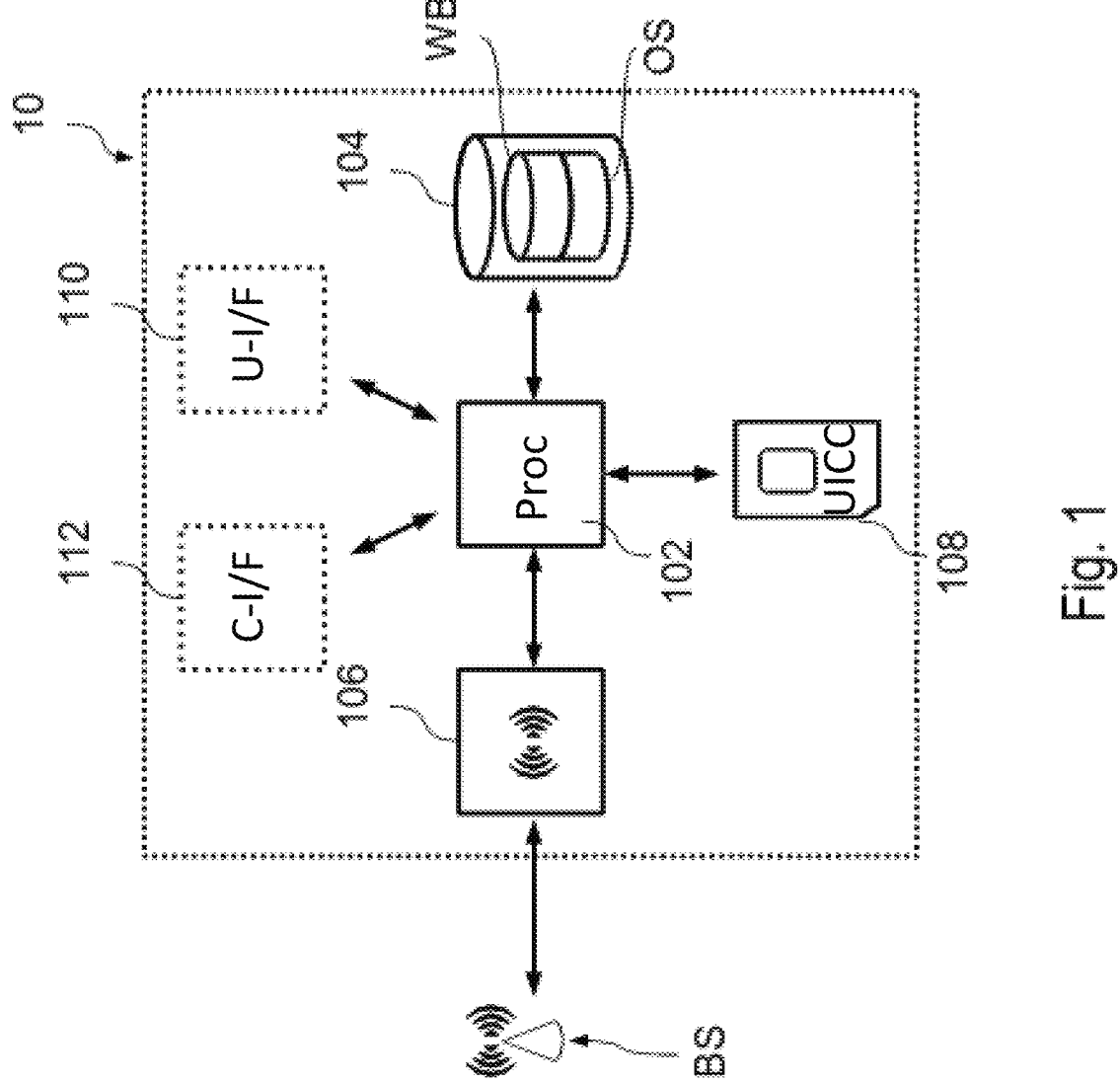
FIGS. 1 to 4 have already been described in the foregoing.
Figure 2:
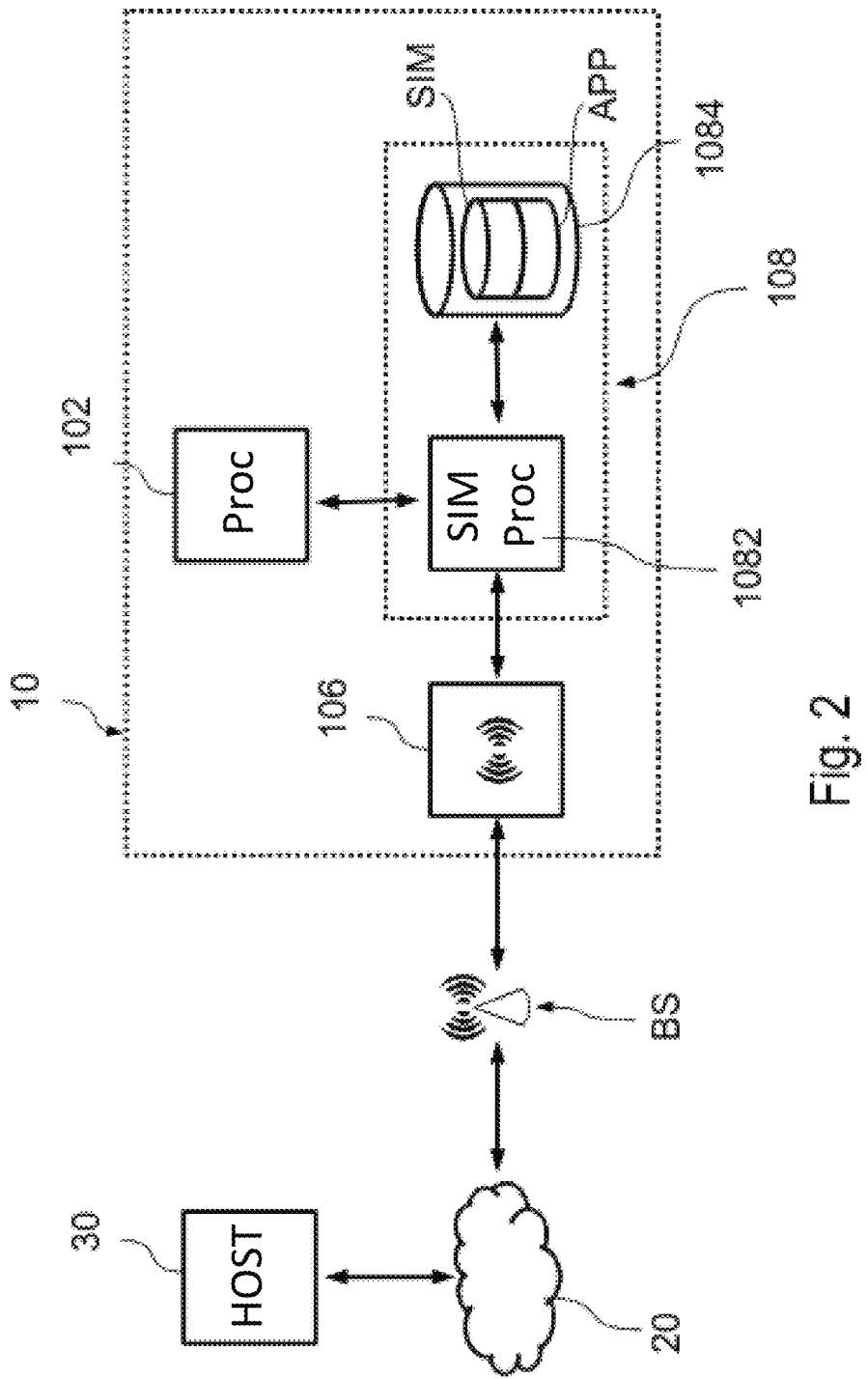
Figure 3:
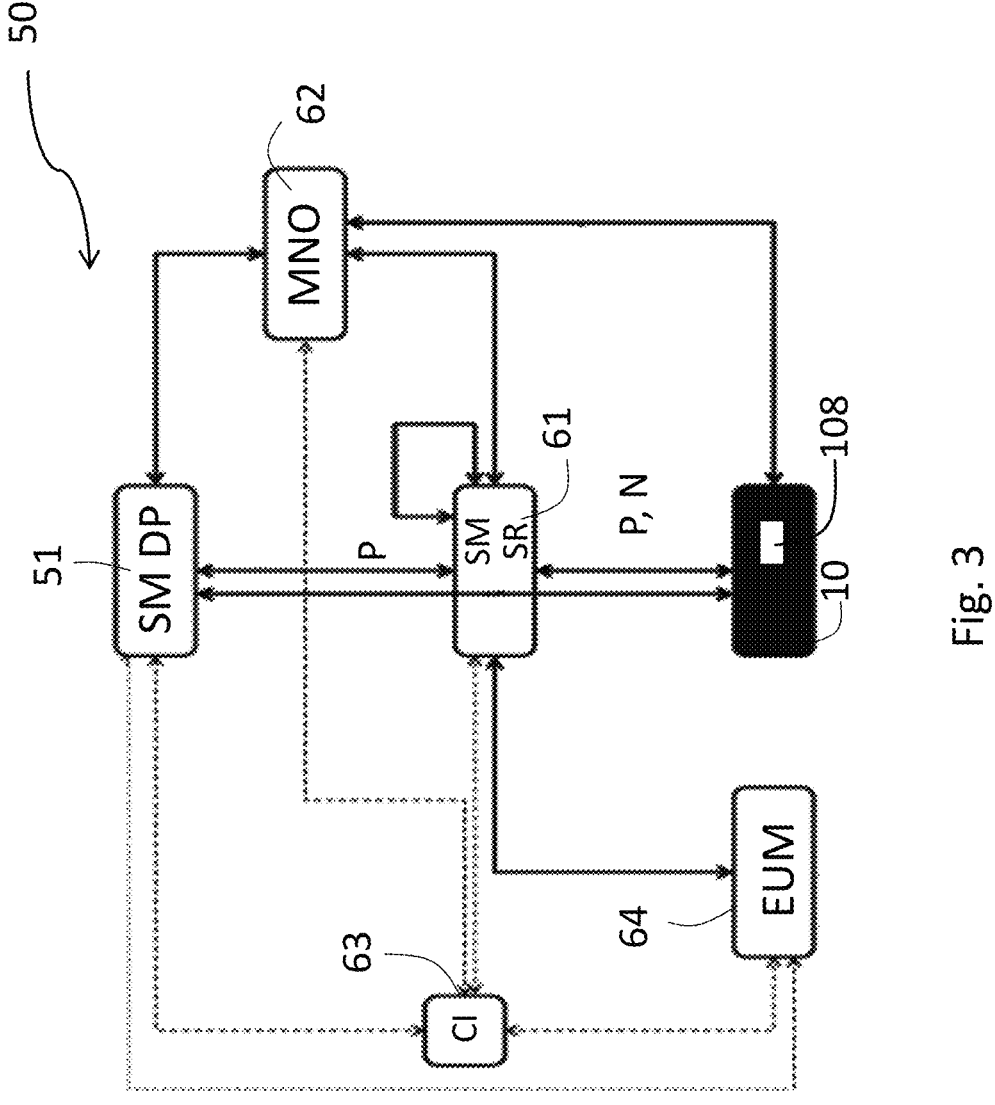

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to previous figures are denoted by the same references previously used in such Figures; the description of such previously described elements will not be repeated in the following in order not to overburden the present detailed description.

The solution here described in brief provides saving message data and all the information needed by the notification mechanism in persistent objects, i.e., objects which are usually stored in the non-volatile portion of memory 1084, and are in any case not transient objects or objects that are not of the CLEAR ON RESET type, i.e., are not cleared when an eUICC reset is performed in the memory. A reset flag, in particular Power Loss Flag is introduced to allow correct management of the notification sequence number in case of a power loss or of another event determining an integrated circuit card circuit reset.

If a power loss occurs during the notification procedure, after a card reset, in the first place it is performed retrieving said notification information from said persistent object for the notification procedure. The notification mechanism should continue with the remaining retries with the same sequence number. Therefore, after a card reset, the notification mechanism procedure is configured to check a reset or Power Loss Flag. If the Power Loss Flag is asserted, e.g., is TRUE, the sequence number is not incremented and the notification procedure continues with the remaining retries. Otherwise, no action after card reset is performed and the sequence number can be incremented for the next notification procedure. The Power Loss Flag is de-asserted, e.g., set to FALSE, in the following cases: Notification procedure completed or Notification procedure failed for protocol failure.

The Power Loss Flag is asserted, e.g., set to TRUE, at the beginning of a notification procedure. This allows in the case of a power loss event (or also another event causing an integrated circuit card circuit reset) during the notification procedure to have the power Loss flag PLF asserted, e.g., set to TRUE.

Figure 4:
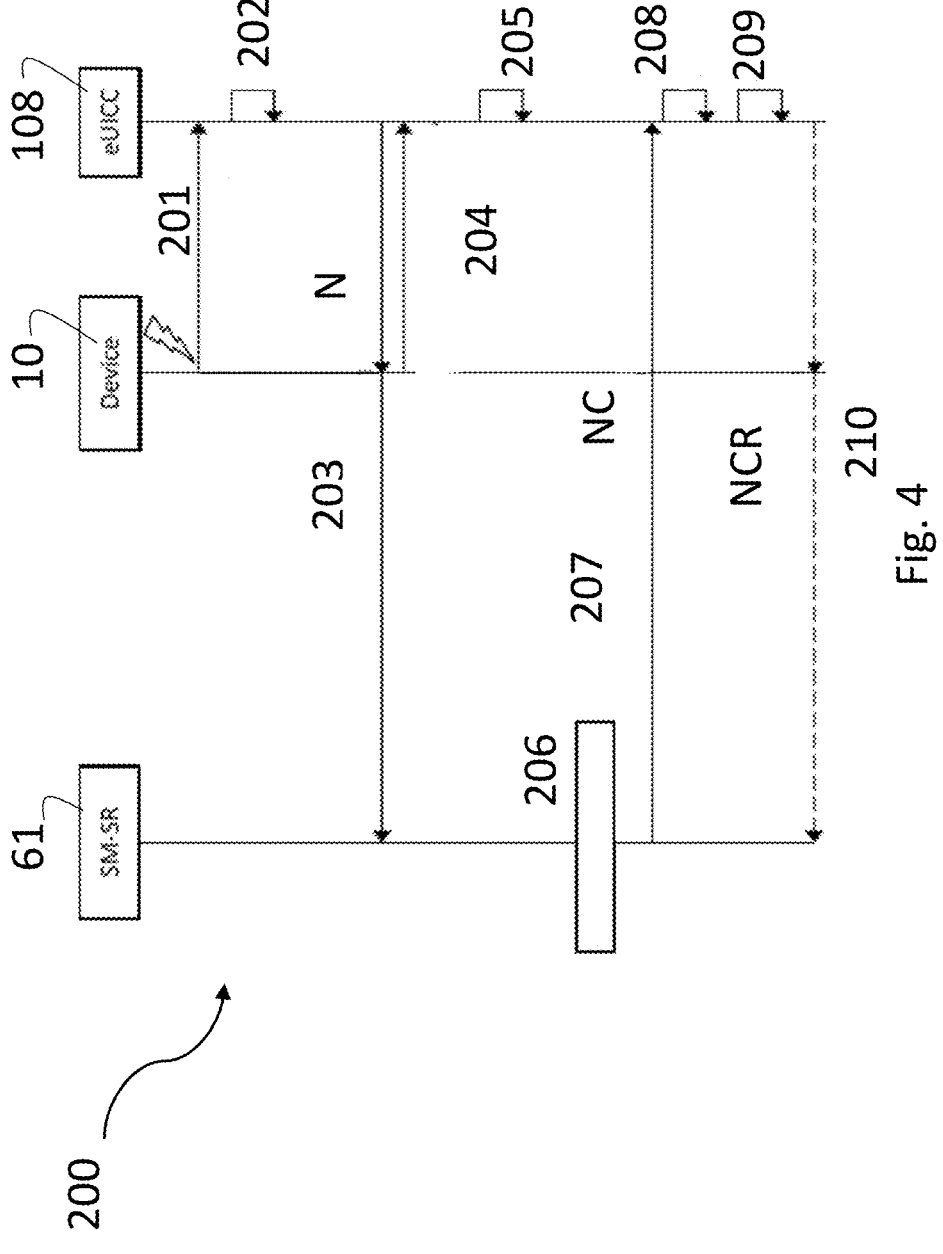
Figure 5:
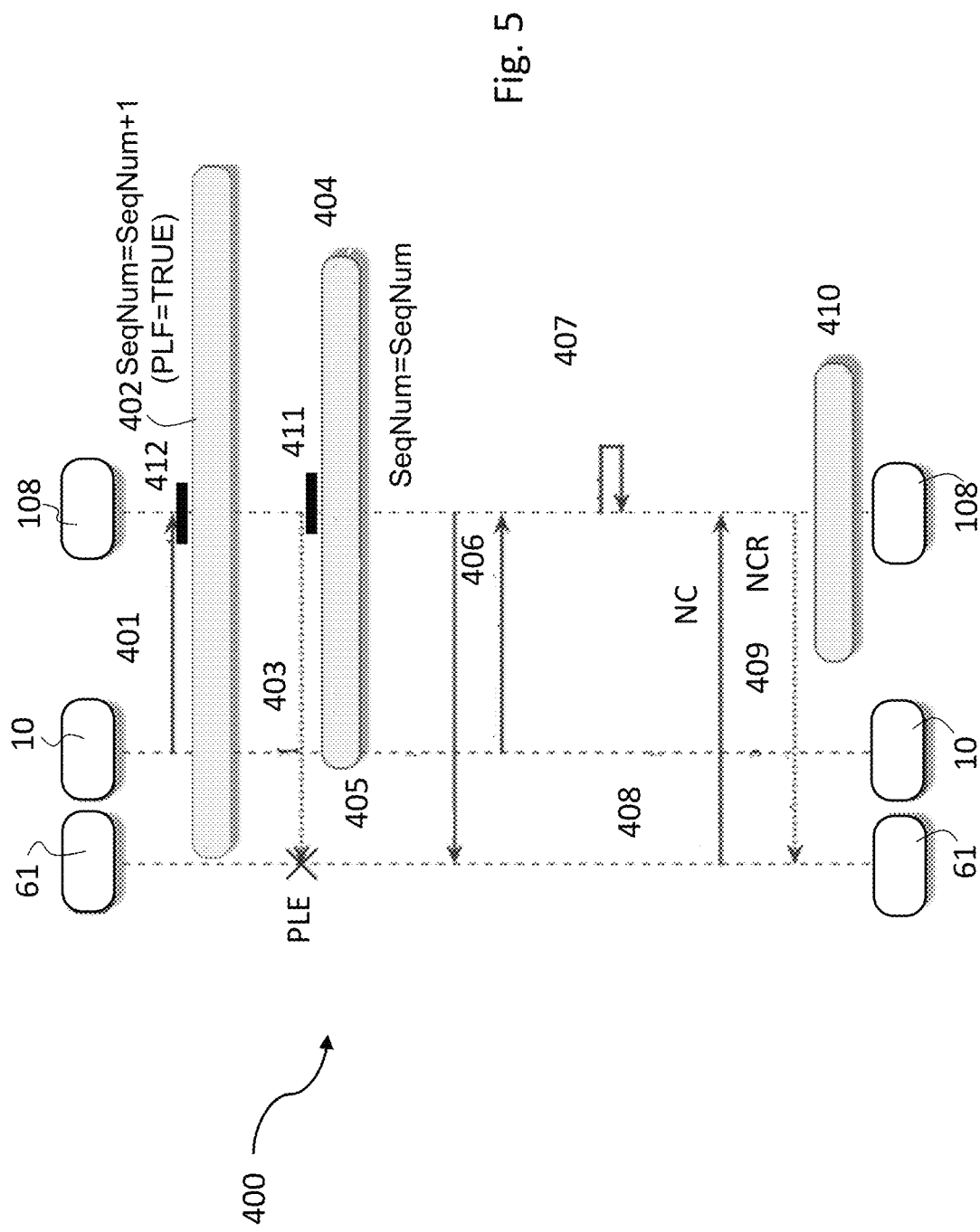
FIG. 5 is a signal diagram representing an implementation of the method according to embodiments.

FIG. 5 shows a signal diagram representing the sequence flow of the method for managing a notification procedure here described according to an embodiment, indicated with 400. In particular the embodiment, like the one in FIG. 4, refers to the use of the SMS protocol.

Thus, step 401 indicates a network attachment of the device 10, like in step 201 in FIG. 4. In the same way, thus, at the end of the start-up sequence, the eUICC 108 detects 402 a first "power on" or a situation where the Enabled Profile has changed compared to the previous eUICC reset.

The eUICC 108 checks during detection step 402 if a power loss flag PLF, i.e., a flag signaling if a power loss has taken place or not, is deasserted, e.g., PLF=FALSE. Since there is no notification procedure pending, in a step 403 the sequence number SeqNum is incremented, e.g., SeqNum=SeqNum+1, the power loss flag PLF is asserted, specifically set to TRUE, and a new notification procedure is started. Therefore, in step 405, analogous to step 203 in FIG. 4, an MO-SMS envelop, i.e., a SMS message, which represents a notification N, is sent. The SMS contains a secure SCP 80 Command Packet using the SCP80 keys of the relevant ISD-R, and containing a notification data structure. The eUICC 108 is configured to use the network information of the Enabled Profile, and the addressing information configured for this profile in ISD-R.

During the execution of the notification procedure, e.g., operation 403 and subsequent confirmation NC and response NCR receivals, it is performed an operation of saving 411 notification information, including said notification message, said notification sequence number, e.g., SeqNum and a number of said one or more attempts left to perform, in persistent objects in the memory, e.g., 1084, in particular non-volatile memory, of the integrated circuit card, e.g., 108. The operation is indicated as executed after sending 403. The notification information is saved by the operation 411 before the eUICC 108 sends the notification N message outside to the SM-SR server 61, (i.e., before communication with the SM-SR server 61)

In the scenario exemplified in FIG. 4, a power loss event PLE is indicated as occurring during the step 405.

After a card reset, it is performed retrieving 412 said notification information from said persistent object, in particular in the non-volatile memory of memory 1084. In particular, an eUICC 108 at start-up (i.e. after a reset RST) typically provides a mechanism, which uses basically a "transaction mechanism", to recover information in case of power loss. This may be a transaction mechanism or method for managing the storing of persistent data, to be stored in at least one memory region of a non-volatile memory device, such as the method described in the European patent application EP 1873642 A1, where storing is performed inside a transaction stack comprising a plurality of transaction entries. If the power loss happens after storing the notification information, since this information is in the non-volatile portion of memory 1084, the values are consistent and in line with the notification procedure. If the power loss happens during update of this information, the notification procedure has not yet started and so it is possible to proceed with the saving operation 411.

Then, after the reset, the eUICC 108 checks in a step 404 if the power loss flag PLF is de-asserted, e.g., Power Loss Flag=TRUE: since a notification procedure is pending, the sequence number is not incremented and the notification mechanism performs the sending 405 of notification N, i.e., the MO-SMS envelope, again.

As shown after a terminal response 406 issued by the Device 10, like in the diagram of FIG. 4 the eUICC 108 is configured to wait 407 for the SM-SR 61 confirmation NC.

When in step 408 the SM SR 61 sends the notification confirmation NC, the eUICC 108 receives the notification confirmation NC, sends 409 the notification confirmation response NCR to the SM-SR servers 61 and asserts 410 the power loss flag, e.g., sets the power loss flag PLF to FALSE.

Thus, at the next notification request, the notification sequence number is be incremented since the power loss flag PLF is asserted, e.g., power loss flag PLF is FALSE. This means that no notification procedure is pending.

Thus, from what has been described above, in general the solution described refers to a method for managing a notification procedure between an integrated circuit card, e.g., 10, in particular an eUICC, operating in a communication device, e.g., 10 configured to communicate with a mobile communication network, e.g., 12, and a remote provisioning system, e.g., 50, said notification procedure being activated by a given event occurring at the communication device, e.g., 10, said notification procedure comprising performing one or more attempts of sending by the integrated circuit card, e.g., 108 a notification, e.g., N comprising a notification message to a node, e.g., 61 of said provisioning system, in particular a SM-SR server, configured to manage over the air communication with the integrated circuit card, e.g., 108, said notification procedure comprising associating to a notification, e.g. N a notification sequence number, e.g., SeqNum.

Wherein, said method comprises: providing a power loss variable or flag, e.g., PLF, which is configured to be set to indicate a power loss at the beginning of said notification procedure; saving notification information, including said notification message, said notification sequence number, e.g., SeqNum and a number of said one or more attempts left to perform, in persistent objects in the memory, e.g., 1084, in particular non-volatile memory, of the integrated circuit card, e.g., 108; when a power loss interrupting the notification procedure occurs at the communication device: after an integrated circuit card circuit reset, then retrieving said notification information from said persistent object; checking the value of said power loss variable or flag, e.g., PLF; if the value of said power loss variable or flag, e.g., PLF indicates power loss, maintaining the notification sequence number, e.g., SeqNum and performing the next of said one or more attempts of notification procedure left; if the value of said power loss variable or flag, e.g., PLF does not indicate power loss, incrementing the notification sequence number, e.g., SeqNum; said power loss variable or flag, e.g., PLF being set to not indicate a power loss if said notification procedure, e.g., 403, 405, is completed or if said notification procedure is failed for a protocol failure or, in particular a reason different from power loss or other card reset determining event.

As mentioned, while the present method is preferably directed to power loss events, the method operates also with events which determine an integrated circuit card reset, thus more in general the method provides checking if the value of a reset variable or flag PLF indicates an integrated circuit card reset, e.g., RST, due to power loss or to another cause, i.e. event which determines a reset of the card, e.g., eUICC, for some interruption, in particular physical interruption.

The number of attempts may include a number of retry for a given communication protocol of notification procedure performed or left and the communication protocols still to be used in a set of communication protocols that can be used for the notification procedure.

Also, in the solution basically the notification procedure comprises at least the steps of: sending 403 a notification message N from the integrated circuit card 108 to the server or node 61, i.e., SM_SR; sending 407 a notification confirmation NC from the server or node 61 to the integrated circuit card 108; and sending 409 said notification confirmation response NCR to said server or node 61 from said integrated circuit card 108.

Other steps among steps 401-409 may be present or also other steps depending from the communication protocol selected.

Thus, the advantages of the solution described hereabove are clear.

The solution described with respect to known approaches guarantees the synchronization with the SM_SR server also in cases of power loss event in the card, in particular eUICC. The method can be applied also other card reset determining events, i.e. event which determines a reset of the card, e.g., eUICC, for some interruption, in particular physical interruption.

This since the method here described provides data structures resistant to power loss and management in the notification mechanism of the event power loss with a dedicated flag to maintain the correct value of sequence number.

Thus the solution here described ensures the consistent behavior of an eUICC in case of a power loss during notification procedures aimed to synchronize the eUICC state, in terms of the currently enabled profile, to the SM-SR server.

Of course, without prejudice to the principle of the invention, the details of construction and the embodiments may vary widely with respect to what has been described and illustrated herein purely by way of example, without thereby departing from the scope of the present invention, as defined by the ensuing claims.

The claims are an integral part of the technical teaching of the disclosure provided herein.

The solution here described has been detailed with reference to an eUICC, but it may be applied also any other integrated circuit card with a similar remote provisioning system using a notification procedure as described, in particular comprising sending a notification message from the card to the server, sending a notification confirmation from the server to the card, sending said notification confirmation response to said server from said card, the notification procedure being activated under similar conditions, e.g. network attachment or profile change or fallback operation.

The invention claimed is:

1. A method for managing a notification procedure between an integrated circuit card operating in a communication device configured to communicate with a mobile communication network and a remote provisioning system, said notification procedure being activated by a given event occurring at the communication device, said notification procedure comprising performing one or more attempts of sending by the integrated circuit card a notification comprising a notification message to a node of said provisioning system configured to manage over the air communication with the integrated circuit card, said notification procedure comprising associating a notification sequence number to each notification, wherein said method comprising:

providing in the integrated circuit card a reset variable or flag configured to be set to indicate an integrated circuit card reset at a beginning of said notification procedure;

saving notification information, including said notification message, said notification sequence number and a number of said one or more attempts left to perform, in persistent objects in the memory of the integrated circuit card;

when an event interrupting said notification procedure occurs at the communication device, then, after an integrated circuit card circuit reset is performed:

retrieving said notification information from said persistent object;

checking a value of said reset variable or flag;

where the value of said reset variable or flag indicates that the integrated circuit card reset occurred, maintaining the notification sequence number and performing a next of said one or more attempts of which are left to perform;

where the value of said reset variable or flag does not indicate that the integrated circuit card reset occurred, incrementing the notification sequence number; and setting said reset variable or flag to not indicate an integrated circuit card reset when said notification procedure is completed or when said notification procedure is failed for a protocol failure or due to a reason different from power loss or other card reset determining event.

2. The method according to claim 1, wherein said reset variable or flag concerns a power loss, and wherein said integrated circuit card reset occurs due to the power loss, and wherein said event is the power loss.

3. The method according to claim 1, wherein said memory is a non-volatile memory.

4. The method according to claim 1, wherein said number of attempts may include a number of retries for a given communication protocol of notification procedure performed or left and the communication protocols still to be used in a set of communication protocols that can be used for the notification procedure.

5. The method according to claim 1, wherein said notification procedure is performed upon occurrence of one of the following conditions:

first network attachment of the communication device;

after a new profile enabling request by the integrated circuit card;

after activation of a fallback mechanism enabling a profile with a fallback attribute.

6. The method according to claim 1, wherein said notification procedure comprises:

sending a notification message from the integrated circuit card to a server;

sending a notification confirmation from the server to the integrated circuit card; and sending said notification confirmation response to said server from said integrated circuit card.

7. The method according to claim 1, further comprising:

in response to a network attachment of the communication device, at the end of a start-up sequence, detecting by the integrated circuit card a first power on or a change of an enabled profile compared to a previous integrated circuit card reset;

checking at the integrated circuit card if the value of said reset variable or flag indicates the integrated circuit card reset;

where no integrated circuit card reset is indicated, incrementing the sequence number, setting the reset variable or flag to indicate the integrated circuit card reset, starting a new notification procedure, and sending a notification message to a server;

where the integrated circuit card reset occurs during the notification procedure, performing an integrated circuit card reset operation and then checking if the value of said reset variable or flag indicates the integrated circuit card reset;

where the value indicates integrated circuit card reset, maintaining the sequence number and performing again the notification procedure, sending said notification from the integrated circuit card to the server, sending said notification confirmation to the integrated circuit card from the server and sending said notification confirmation response to said server from said integrated circuit card; and upon completion of said notification procedure, setting the reset variable or flag to indicate no power loss.

8. The method according to claim 1, wherein said integrated circuit card is an eUICC, said node is a SM-SR server and said integrated circuit card and provisioning system operate according to a GSMA standard.

9. A system architecture, comprising:

an integrated circuit card operating in a communication device configured to communicate with a communication network; and a server configured to manage over the air communication with the integrated circuit card;

wherein the system architecture performs the method for managing a notification procedure as recited in claim 1.

10. An integrated circuit card configured to perform card operations in accordance with the method of claim 1.

11. A method, comprising:

performing a notification procedure including one or more attempts to send by an integrated circuit card a notification comprising a notification message to a node of a provisioning system configured to manage over the air communication with the integrated circuit card;

wherein said notification comprises a notification sequence number;

saving notification information, including said notification message, said notification sequence number and a number of said one or more attempts left to perform, in persistent objects in the memory of the integrated circuit card;

providing a reset variable or flag in said integrated circuit card;

in response to an event interrupting said notification procedure:

resetting said integrated circuit card;

retrieving said notification information from said persistent object;

checking a value of said reset variable or flag;

when the value of said reset variable or flag indicates the reset of the integrated circuit card, maintaining the notification sequence number and performing a next of said one or more attempts of which are left to perform;

when the value of said reset variable or flag does not indicate the reset of the integrated circuit card, incrementing the notification sequence number; and setting said reset variable or flag to not indicate an integrated circuit card reset when said notification procedure is completed.

12. The method according to claim 11, wherein said notification procedure is performed upon occurrence of one of the following conditions:

first network attachment of the communication device;

after a new profile enabling request by the integrated circuit card;

after activation of a fallback mechanism enabling a profile with a fallback attribute.

13. The method according to claim 11, wherein said notification procedure comprises:

sending a notification message from the integrated circuit card to a server;

sending a notification confirmation from the server to the integrated circuit card, sending said notification confirmation response to said server from said integrated circuit card.

14. The method according to claim 11, further comprising:

in response to a network attachment of a communication device using said integrated circuit card, detecting by the integrated circuit card a first power on or a change of an enabled profile compared to a previous integrated circuit card reset;

checking whether the value of said reset variable or flag indicates reset of the integrated circuit card; and where no reset of the integrated circuit card reset is indicated, incrementing the sequence number, setting the reset variable or flag to indicate the integrated circuit card reset; starting a new notification procedure; and sending a notification message to a server.

\* \* \* \* \*